US010524280B1

(12) United States Patent
Klomsdorf et al.

(10) Patent No.: US 10,524,280 B1
(45) Date of Patent: Dec. 31, 2019

(54) MODULE FOR VOICE SIGNAL INTERFERENCE MITIGATION FOR DUAL CONNECTIVITY APPLICATIONS

(71) Applicant: MOTOROLA MOBILITY LLC, Chicago, IL (US)

(72) Inventors: Armin Klomsdorf, Chicago, IL (US); Dale Schwent, Schaumburg, IL (US); John R. Mura, Clarendon Hills, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/354,145

(22) Filed: Mar. 14, 2019

(51) Int. Cl.
*H04W 72/12* (2009.01)
*H04W 72/04* (2009.01)
*H04W 88/06* (2009.01)

(52) U.S. Cl.
CPC ..... *H04W 72/1231* (2013.01); *H04W 72/042* (2013.01); *H04W 88/06* (2013.01)

(58) Field of Classification Search
CPC ........... H04W 72/1231; H04W 72/042; H04W 88/06
See application file for complete search history.

(56) References Cited

U.S. PATENT DOCUMENTS

| | | | | |
|---|---|---|---|---|
| 2012/0275350 | A1* | 11/2012 | Kwok | H04B 1/406 370/277 |
| 2015/0327280 | A1* | 11/2015 | Zhang | H04W 72/1215 370/280 |
| 2017/0093457 | A1* | 3/2017 | Jain | H04B 1/401 |
| 2018/0367230 | A1* | 12/2018 | Su | H04J 1/08 |
| 2019/0215857 | A1* | 7/2019 | Lin | H04L 5/0055 |
| 2019/0254110 | A1* | 8/2019 | He | H04L 5/0048 |

OTHER PUBLICATIONS

Peng, Tao et al., "Interference Avoidance Mechanisms in the Hybrid Cellular and Device-to-Device Systems", IEEE 20th International Symposium on Personal, Indoor and Mobile Radio Communications, Sep. 2009.

* cited by examiner

*Primary Examiner* — Brandon J Miller
(74) *Attorney, Agent, or Firm* — Yudell Isidore PLLC

(57) ABSTRACT

A method for identifying, at a communication device, operation in a dual connect operating mode that enables the communication device to concurrently communicate with a first network source and a second network source. The method including monitoring, by a controller of the communication device, a plurality of transmission characteristics of a first and second transmitter and a first receiver of the communication device. The method including determining, based on the plurality of transmission characteristics, whether concurrent transmissions by the first and second transmitters result in an intermodulation interference condition that interferes with a voice carrying signal. In response to the concurrent transmissions resulting in the intermodulation interference condition, the method including mitigating an effect of the intermodulation interference condition by rescheduling transmission of at least one data signal between a second transmitter and a second network source to a later time period.

20 Claims, 9 Drawing Sheets

| 300 | | 325 | 335 |
|---|---|---|---|
| NETWORK SOURCE A 320 | NETWORK SOURCE B 330 | m | n |
| 2 | n2 | -1 | 2 |
|  |  | 2 | -1 |
|  |  | -2 | 3 |
|  |  | 3 | -2 |
| 5 | n5 | -1 | 2 |
|  |  | 2 | -1 |
|  |  | -2 | 3 |
|  |  | 3 | -2 |
| 5 | n13 | 2 | -1 |
| 13 | n5 | 2 | -1 |
| 5 | n66 | -1 | 1 |
|  |  | -3 | 2 |
| 2 | n66 | 2 | -1 |

FIG. 3

MODULE FOR VOICE SIGNAL INTERFERENCE MITIGATION FOR DUAL CONNECTIVITY APPLICATIONS

BACKGROUND

1. Technical Field

The present disclosure relates generally to communication devices with dual transmitters, and more particularly to communication devices having concurrently-transmitting dual transmitters.

2. Description of the Related Art

For upcoming fifth generation (5G) cellular deployments, 3rd Generation Partnership Project (3GPP) has defined Multi-Rat Dual Connectivity (MR-DC) as an operating mode. In this mode, a user equipment (UE) connects to two different networks, each network having its own distinct scheduler. Each of the networks can be, for instance, an existing 4G LTE or a 5G new radio (NR) networks. Since each network has its own scheduler, each network will operate with a unique timetable for the UE transmit and receive frequencies and timings.

If at least one of the technologies is frequency division duplex (FDD), these uncoordinated schedules mean the UE might transmit on both technologies simultaneously, while receiving on at least one of them. In the case where the UE is receiving application data (web pages, e-mail, etc.), packets may be lost due to the uncoordinated scheduling, resulting in less data throughput. The loss of data is more impactful for applications such as voice or video telephony. Often, a user continues to generate uninterrupted audio/video input unaware of a network signal transmission fail. In voice or video telephony there is only limited opportunity to re-transmit the voice/video carrying signal before its continuity is lost. Due to the uncoordinated scheduling, the user will experience drop outs in the audio, or discontinuous "skips" in the video.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 is an example lookup table illustrating intermodulation products that cause voice interference for the communication device of FIG. 1;

DETAILED DESCRIPTION

Figure 1:
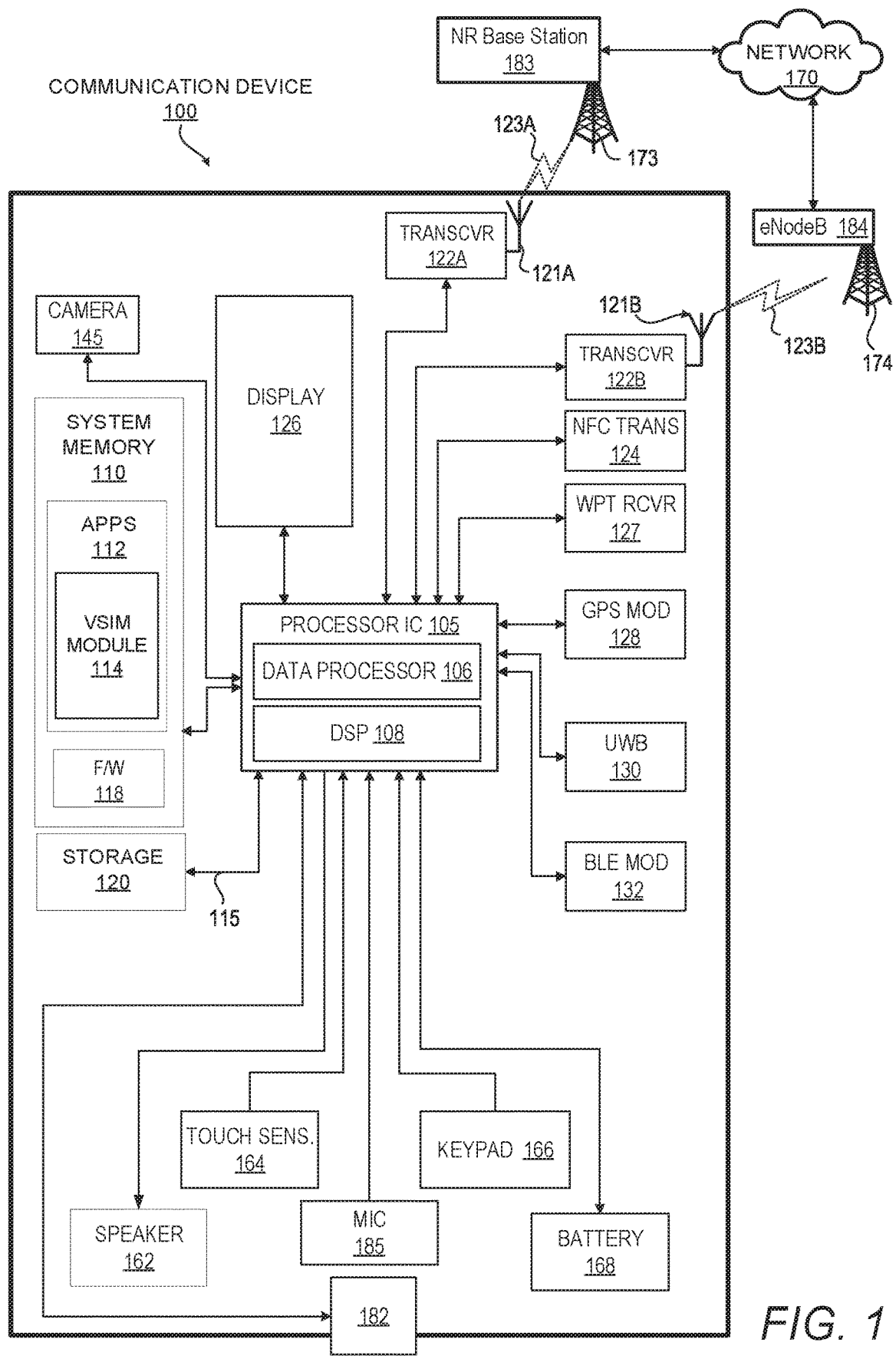
FIG. 1 is a functional block diagram illustrating a communication device having two transceivers that can transmit concurrently, according to one or more embodiments.

Disclosed are a method, a communication device, and a computer program product to mitigate voice signal interference during dual connectivity applications. The method includes identifying operation by the communication device in a dual connect operating mode that enables the communication device to concurrently communicate with a first network source and a second network source. The method includes monitoring, by a controller of the communication device, a plurality of transmission characteristics of a first transmitter, a second transmitter, and a first receiver of the electronic device. The method further includes determining, based on the plurality of transmission characteristics, whether concurrent transmissions by the first and second transmitters result in an intermodulation interference condition. The intermodulation interference condition interferes with a voice carrying signal transmitting between the first receiver and the first network source. In response to the concurrent transmissions resulting in the intermodulation interference condition, the method includes mitigating an effect of the intermodulation interference condition by rescheduling transmission of at least one data signal between the second transmitter and the second network source to a later time period.

According to one embodiment, a communication device comprises first and second transmitters capable of concurrently-transmitting during a dual connect operating mode. The communication device includes a first receiver that receives a voice-carrying signal. The communication device further includes a controller communicatively coupled with the first and second transmitters and that executes a voice signal interference mitigation module, which enables the communication device to identify operation in a dual connect operating mode. The dual connect operating mode enables the electronic device to concurrently communicate with a first network source and a second network source. The voice signal interference mitigation module enables the communication device to monitor, by a controller of the communication device, a plurality of transmission characteristics of a first transmitter, a second transmitter, and a first receiver of the electronic device. The voice signal interference mitigation module further enables the communication device to determine, based on the plurality of transmission characteristics, whether concurrent transmissions by the first and second transmitters result in an intermodulation interference condition. The intermodulation interference condition interferes with a voice carrying signal transmitting between the first receiver and a first network source. In response to the concurrent transmissions resulting in the intermodulation interference condition, the voice signal interference mitigation module further enables the communication device to mitigate an effect of the intermodulation interference condition by rescheduling transmission of at least one data signal between the second transmitter and the second network source to a later time period.

According to another embodiment, a computer program product includes a computer readable storage device and program code on the computer readable storage device. When executed within a processor associated with a device, the program code enables the device to provide the various functionality presented in the above-described method processes.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates example communication device 100, within which certain aspects of the disclosure can be practiced, in accordance with one or more embodiments. For simplicity, communication device 100 is interchangeably referred to hereinafter as electronic device 100. Communication device 100 includes at least one processor integrated circuit (IC) 105. Processor IC 105 includes data processor 106. Processor IC 105 is referred to, in totality, herein as "processor" 105. Processor 105 is coupled to system memory 110 and non-volatile storage 120 via a system communication mechanism, such as system interconnect 115. One or more software and/or firmware modules can be loaded into system memory 110 during operation of communication device 100. Specifically, system memory 110 includes applications 112 and firmware (F/W) 118. System memory 110 includes therein voice signal interference mitigation (VSIM) module 114, for mitigating intermodulation interference conditions during voice signal communications, as will be discussed herein. System memory 110 may also include basic input/output system and an operating system (not shown).

Processor 105 supports connection by and processing of signals from one or more connected input/output devices such as display 126, camera 145, speaker 162, touch sensor 164, keypad 166, microphone 185. Additionally, in one or more embodiments, one or more device interfaces 182, such as an optical reader, a universal serial bus (USB), a card reader, Personal Computer Memory Card International Association (PCMIA) slot, and/or a high-definition multimedia interface (HDMI), can be associated with communication device 100. Communication device 100 also contains a power source, such as a battery 168, that supplies power to communication device 100.

Communication device 100 further includes antennas 121A and 121B, respectively connected to transceiver 122A and 122B to enable receiving and transmitting data when in communication with one or more base stations. Transceiver 122A and 122B allow for wide-area or local wireless communication, via wireless signal 123A and 123B. Wireless signal 123A and 123B is communicated via antennas 173 and 174 between communication device 100 and New Radio (NR) base station 183, as well as evolved node B (eNodeB) 184. NR base station 183 can be, for example, evolved-Universal Terrestrial Radio Access-New Radio (E-UTRA NR). NR base station 183 and eNodeB 184 are each a base station that manages the transmission of signals from mobile devices, such as communication device 100, in one or more cells. Communication device 100 is capable of wide-area or local wireless communication with other mobile wireless devices or with NR base station 183 and eNodeB 184 as a part of a wireless communication network. Communication device 100 can connect to NR base station 183 utilizing a dual connect operating mode. Dual connect operating mode allows communication device 100 to exchange data between NR base station 183 along with simultaneous connection with eNobeB 184. Communication device 100 communicates with other mobile wireless devices by utilizing a communication path involving transceivers 122A and/or 122B, antennas 121A and/or 121B, wireless signals 123A and/or 123B, antennas 173 and/or 174, and NR base station 183 and eNodeB 184.

In one embodiment, other devices within communication device 100 utilize antennas 121A, 121B, and/or a different antenna subsystem (within wireless components of communication device 100) to send and/or receive signals in the form of radio waves. These devices include near field communication transceiver (NFC TRANS) 124, wireless power transfer receiver (WPT RCVR) 127, global positioning system module (GPS MOD) 128, ultra-wideband (UWB) transceiver 130, and Bluetooth Low Energy (BLE) module 132, all of which are communicatively coupled to processor 105. While presented as dual antennas, it is appreciated that multiple different antenna modules can be provided within communication device 100 to support communication via the various different types of communication technology. For example, GPS MOD 128 communicatively couples to antenna 121A and/or 121B to receive location data. UWB transceiver 130 communicatively couples to antenna 121A and/or 121B and uses radio technology that can operate with very low energy levels to send and/or receive high-bandwidth communications within an approximated range. Further, BLE MOD 132 may connect to antenna 121A and/or 121B, enabling communication device 100 and/or components within communication device 100 to communicate and/or interface with other devices, services, and components that are located external to communication device 100 and use Bluetooth technology.

As provided by FIG. 1, communication device 100 additionally includes VSIM module 114 which executes on processor 105 to coordinate transmission of data signals during the dual connect operating mode. In at least one embodiment, VSIM module 114 may be a component of, may be combined with, or may be incorporated within one or more applications 112. Additional aspects of VSIM module 114 and the functionalities thereof, are presented within the description of FIGS. 2-9. Further, communication device 100 is presented as a wireless communication device.

As a wireless device, communication device 100 can communicate data over network 170. Communication device 100 transmits data to and/or receives data from network 170 via NR base station 183 and eNodeB 184. Communication device 100 and components thereof are further discussed in FIG. 2.

Figure 2:
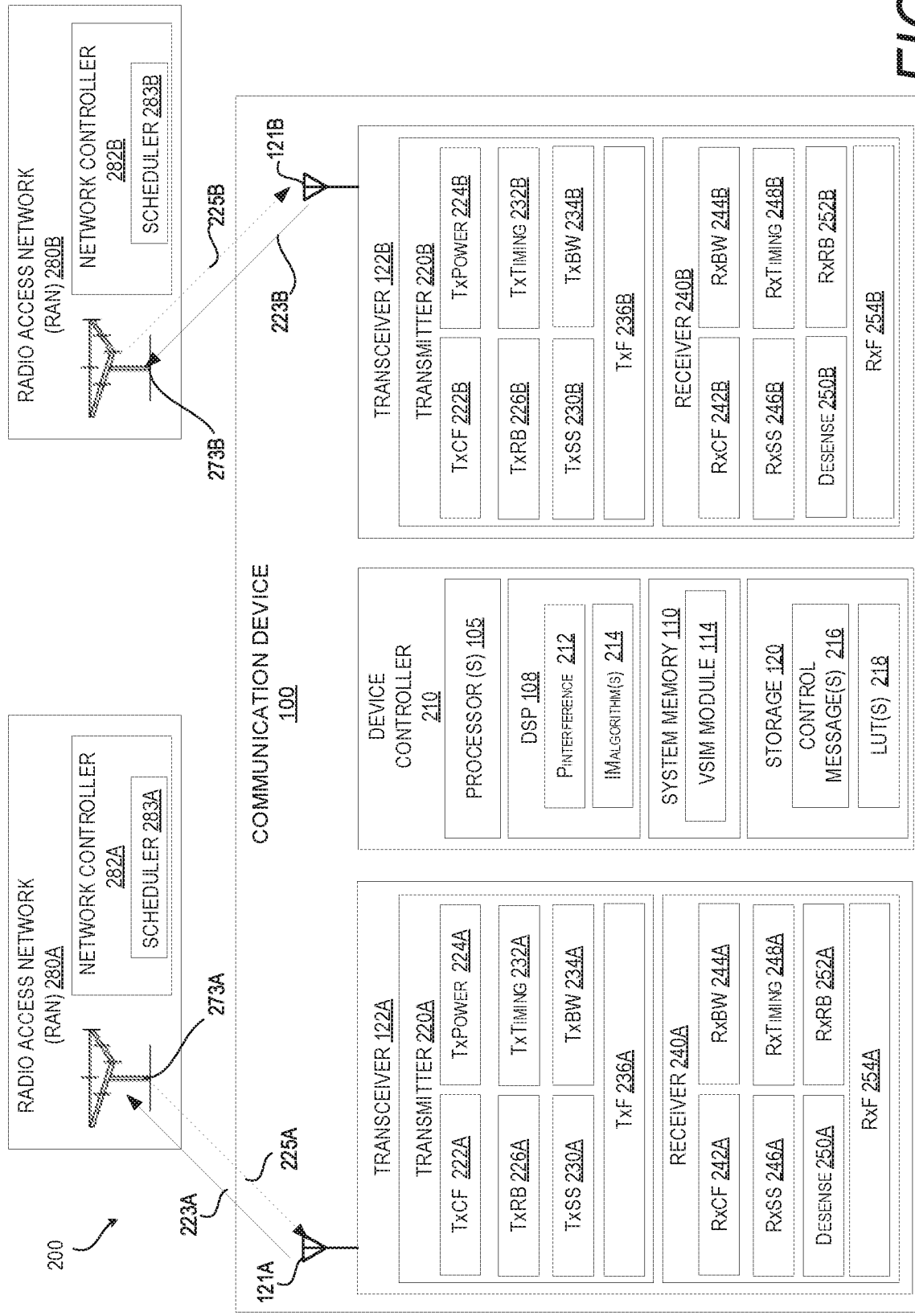
FIG. 2 illustrates a functional block diagram of transceivers utilized in a dual connectivity network system for the communication device of FIG. 1 within which certain of the functional aspects of the described embodiments may be implemented.

With specific reference now to FIG. 2 which illustrates a functional block diagram of transceivers 122A and 122B utilized in dual connectivity network system 200 for communication device 100 of FIG. 1 within which certain of the functional aspects of the described embodiments may be implemented. Communication device 100 is a wireless communication device adapted to coordinate the transmitting and receiving of RF signals. The signals are communicated over an air interface via uplink and/or downlink channels between the communication device 100 and communication network equipment within radio access network RAN 280A and 280B. The RF signals over an air interface via uplink and/or downlink channels communicate data packets between the communication device 100 and communication network equipment with RAN 280A and 280B. In one or more embodiments, communication device 100 can be a mobile cellular device/phone or smartphone, or laptop, netbook or tablet computing device, or other types of communications devices.

Dual connectivity network system 200 includes, generally, communication device 100, radio access network (RAN) 280A and RAN 280B. Communication device 100 includes antenna 121A connected to transceiver 122A, antenna 121B connected to transceiver 122B, and device controller 210. RAN 280A and RAN 280B are a first and a second network source that communicate to corroborate dual connectivity operations with communication device 100. Each of RAN 280A and RAN 280B can be, for instance, either existing fourth generation Long Term Evolution (4G LTE) or fifth generation New Radio (5G NG) network. RAN 280A and 280B respectively include network resources such as network controller 282A and 282B, as well as node 273A and 273B. Each of RAN 280A and RAN 280B respectively include scheduler 283A and 283B. Each of scheduler 283A and 283B operate with a unique timetable for transmit and receive frequencies and timings associated with communication device 100.

Transceiver 122A includes transmitter 220A and receiver 240A. Transmitter 220A includes a plurality of transmission characteristic inputs for receiving, storing, and updating select transmission characteristics associated with transmitter 220A of communication device 100. The plurality of transmission characteristic inputs for transmitter 220A include transmit center frequency (TxCF) 222A, transmit power (TxPower) 224A, transmit resource block (TxRB) 226A, transmit signal strength (TxSS) 230A, transmit timing (TxTiming) 232A, transmit bandwidth (TxBW) 234A, and real-time voice signal frequency (TxF 236A). Receiver 240A includes a plurality of receive characteristic inputs for receiving, storing, and updating select receive signal characteristics associated with receiver 240A of communication device 100. The plurality of transmission characteristic inputs for receiver 240A include receive center frequency (RxCF) 242A, receive bandwidth (RxBW) 244A, receive signal strength (RxSS) 246A, receive timing (RxTiming) 248A, desense power level (desense) 250A, receive resource block (RxRB) 252A, receive signal frequency (RxF) 254A.

Similarly, transceiver 122B includes transmitter 220B and receiver 240B. Transmitter 220B includes a plurality of transmission characteristic inputs for receiving, storing, and updating select transmission characteristics associated with transmitter 220B of communication device 100. The plurality of transmission characteristic inputs for transmitter 220B include TxCF 222B, TxPower 224B, TxRB 226B, TxSS 230B, TxTiming 232B, TxBW 234B, and TxF 236B. Receiver 240B includes a plurality of receive characteristic inputs for receiving, storing, and updating select receive signal characteristics associated with receiver 240B of communication device 100. The plurality of transmission characteristic inputs for receiver 240B include RxCF 242B, RxBW 244B, RxSS 246B, RxTiming 248B, desense 250B, RxRB 252B, and RxF 254B.

Device controller 210 includes processor(s) 105, DSP 108, system memory 110, and storage 120. DSP 108 receives one or more continuous variables, discrete variables, transmission characteristic values, and/or frequency values. The frequency values can be retrieved, for example, from look up table (LUT) 218. Processor 105 generates control message(s) 216 and LUT 218. Storage 120 stores control message(s) 216 and LUT 218. DSP 108 computes values for interference power ($P_{interference}$) 212. Further, DSP 108 includes intermodulation algorithms ($IM_{algorithms}$) 214 which is equipped with known intermodulation equations. Utilizing equations provided by $IM_{algorithms}$ 214, DSP 108 outputs a binary value (e.g. true or false, yes or no) value with respect to whether or not an intermodulation relationship between a first and a second network resource causes voice interference. System memory 110 includes VSIM module 114. VSIM module 114 provides program code and other software and data necessary to perform aspects of the present disclosure to of processor 105. Program code and other software and data can be stored on a computer readable storage device. The program code provided by VSIM module 114 provisions a wireless communication device, such as communication device 200 with program code that, when executed by processor 105, provide the functionality to mitigate an effect of intermodulation interference conditions and preserve a high-quality voice call performance.

In operation, VSIM module 114 enables processor 105 to identify that communication device 100 is operating in a dual connect operating mode that enables communication device 100 to concurrently communicate with RAN 280 A and RAN 280B. Device controller 210 monitors the plurality of transmission characteristics of transmitter 220A and transmitter 220B. Further, device controller 210 monitors a plurality of transmission characteristics of one of receiver 240A and 240B. More specifically, device controller 210 monitors the plurality of transmission characteristics for a first receiver, where the first receiver is receiving the voice carrying signal from a respective network source (RAN 280A or 280B). During dual connectivity operations antennas 121A and 121B respectively exchange communication with node 273A and 273B via transmission signals 223A, 225A, 223B, and 225B. Processor 105 determines, based on the plurality of transmission characteristics, whether concurrent transmissions of a signal (223A and 223B) by transmitter 220A and transmitter 220B result in an intermodulation interference condition. More specifically, the intermodulation condition interferes with the voice carrying signal (225A or 225B) transmitting between the respective network RAN 280A or 280B and first receiver (240A or 240B). In response to the concurrent transmissions resulting in the intermodulation interference condition, processor 105 mitigates an effect of the intermodulation interference condition by rescheduling transmission of at least one data signal between the second transmitter (220A or 220B) and the second network source (282A or 282B) to a later time period.

In one embodiment, processor 105 actively mitigates intermodulation interference conditions. Processor 105 generates an autonomous response to reschedule transmission of the at least one data signal on the NR data channel. In this example, RAN 280B is the NR data channel and transceiver 122A is the voice carrying technology. DSP 108 receives, as transmission characteristics inputs, TxCF 222A and 222B, TxPower 224A and 224B, TxRB 226A and 226B as well as TxTiming 232A and 232B. Further, DSP 108 receives as inputs RxCF 242A and RxRB 249A. Processor 105 utilizes desense 250A to characterize the desense performance of transceiver 122A. Based on the transmission characteristics, processor 105 calculates a transmit power adjustment and a spectrum intersection adjustment. The transmit power adjustment and a spectrum intersection adjustment enables VSIM 114 to determine a desense power level of the data signal. In response to the desense power level of the data signal not exceeding a predetermined desense threshold, processor 105 enables transmitter 220B to transmit the data signal at an originally scheduled time.

In another embodiment, transmitter 220B does not transmit the data signal at an original scheduled time in response to detecting that at least three predetermined intermodulation interference conditions are satisfied. More specifically, transmitter 220B does not transmit the data signal when: (i) TxCF 222A and RxCF 242A, carrying the voice signal, result in an intermodulation interference condition as determined by $IM_{algorithms}$ 214; (ii) Processor 105 further detects whether both transmit (223A) and voice carrying receive signal (225A) are all active at the same time; and (iii) the receive signal strength, RxSS 246A/246B) is not sufficiently above a predetermined threshold that is based on a real-time $P_{interference}$ 212, and desense 250A is above a predetermined threshold. The real-time $P_{interference}$ 212 is determined based, at least in part, on TxPower 224A and 224B. In one example, the intermodulation interference condition can be, for example, m*ftx1+n*ftx2=frx_k, where ftx_1 is $Tx_{CF}$ 222A, ftx2 is $Tx_{CF}$ 222B, frx_k is the corresponding receive frequency to transmitter 220A or transmitter 220B. Further m and n are integers that are associated with the order of the distortion product. The order of the distortion product is given by the sum of m+n, where m and n are integers For any given pair of frequency bands such as $Tx_{CF}$ 222A and $Tx_{CF}$ 222B there may be none, one, or more than one m and n pair that satisfy the intermodulation interference condition. In response to processor 105 detecting frequency band support for each of transmitter 220A and 220B, a lookup table is generated with all the m and n pairs known to cause voice interference. An example of such a table is shown in FIG. 3.

Not transmitting the data signal at an original scheduled time in response to detecting that at least three predetermined intermodulation interference conditions are satisfied advantageously mitigates an effect of the intermodulation in order to preserve a high-quality voice call performance. Consequently, the data signal throughput on transmitter 220B is temporarily reduced. A reduction in the data signal throughput only occurs for a small percentage of the frequency allocations. The impact on data throughput is further mitigated by the time probability of both transmitters (220A and 220B) and the voice receive signal overlapping. In response to the desense power level (desense 228B) of the data signal not exceeding a predetermined desense threshold, processor 105 enables transmitter 220B to transmit the data signal at an original scheduled time. In response to communication device 100 not transmitting a data signal as scheduled, network controller 282B identifies that at least one data signal carrying data packet between communication device 100 and RAN 280B has been lost. As a result, network controller 282B requests a resend of the lost packet.

In another embodiment, processor 105 predictively mitigates intermodulation interference conditions. Processor 105 generates a calculated prediction for determining whether a resource assignment increases degradation of a voice carrying signal. In response to receiving a resource assignment from RAN 280A and/or RAN 280B, processor 105 activates DSP 108 to calculate $P_{Interference}$ 212. In another example, DSP 108 utilizes an algorithm stored by $IM_{Algorithms}$ 214 to determine degradation, and specifically voice degradation, of the voice carrying signal. The quality of the voice signal level is compared to a predetermined degradation threshold. In one example, a typical LTE transceiver would require an interference level of −113 dBm/2 RB to meet a desense target of 1 dB (a desense level only marginally acceptable to a mainstream wireless provider). Measured results for communication devices that do not include the modifications of communication device 100 show intermodulation interference levels 30 dB or more above the −113 dBm threshold. An example value for the predetermined degradation threshold is selected so that processor 105 implements a change before a desense level of 1 dB is reached. Therefore, in response to the voice carrying signal being degraded beyond a predetermined degradation threshold, processor 105 generates a control message. Processor 105 retrieves transmit characteristics, for example, a real-time voice signal frequency (TxF 236A), a resource block value (RxRB 252A), and timing information (TxTiming 232A) associated with the first network source (RAN 280A). Processor 105 generates a schedule control message (216) that includes the values for TxF 236A, RxRB 252A, and TxTiming 232A that are associated with RAN 280A. Processor 105 transmits the schedule control message (216) to RAN 280B to reschedule transmission of the data signal based on the values provided by TxF 236A, RxRB 252A, and TxTiming 232A associated with communications to RAN 280A. The control message (216) instructs network controller 282B to reschedule transmission of data signals between communication device 100 and the second network source, RAN 280B. In another example, processor 105 generates the control message for only halting transmission of the data signal between the second transmitter (220B) and the second network source (280B) during transmissions of the voice carrying signal.

Further, processor 105 communicates to network controller 282B control message 216 indicating data (non-voice/video) will not be communicated during any timeslots when voice can be degraded beyond a predetermined intermodulation interference threshold. Processor 105 mitigates an effect of the intermodulation interference condition based in part on the plurality of transmission characteristics. Processor 105 reschedules transmission of at least one data signal between the second transmitter (220B) and the second network source (280B) to a later time period. The network sources (RAN 280A and 280B) are preemptively notified when an uplink data packet is not sent as scheduler 283A or 283B dictates. Processor 105 notifies the respective RAN (280A or 280B) to schedule communication device 100 differently in time or frequency to avoid the interference modulation condition. In response to receiving an updated resource assignment, or in response to the active assignments no longer causing the interference modulation condition, processor 105 generates a second control message to withdraw signal transmit limitations for scheduling communication between the respective network source and communication device 100. Processor 105 transmits the second control message 216 to the respective network source. Predictively mitigating and actively mitigating interference modulation is an advantageous improvement over simply actively mitigating.

In still another embodiment, processor 105 perceptively mitigates intermodulation interference conditions. RAN 280A and RAN 280B are not in close communication with each other. Due to the disconnect in communication between RAN 280A and RAN 280B, network controller 282A and 282B are limited in the ability to coordinate schedules and corrective action when either network receives a warning concerning a voice degradation condition. In one example, network controller 283B detects a voice carrying signal and/or technology is experiencing degradation due to the scheduling assignments. However, network controller 282B is only aware of schedules generated by scheduler 283B. Therefore, processor 105 generates a first control message to predictively mitigate the intermodulation interference as previously discussed. In response to the first control message not correcting the detected voice degradation to below a predetermined degradation threshold, processor 105 generates a second control message to perceptively mitigate the intermodulation interference conditions. In this example, transmitter 220A is communicating the voice carrying signal to RAN 280A. Processor 105 generates the second control message 216 based on the following transmission characteristics of each transmitter: TxCF 222A and 222B, TxRB 226A and 226B, TxTiming 232A and 232B, and TxBW 234A and 234B. Processor 105 transmits the second control message 216 to the network source (RAN 280B) which is communicating the data carrying signal, where there is a voice carrying signal and a data carrying signal. Characterized by the transmission characteristics, the second control message identifies one or more causes of the intermodulation interference condition and triggers at least one of a schedule modification and signal frequency modification. Transmitting the second control message to RAN 280B enables network controller 282B to have knowledge of frequency and time parameters of both networks (RAN 280A and RAN 280B). The schedule modification and/or signal frequency modification generated as a result of the second control message enables RAN 280B to avoid transmission of the data signal during the intermodulation interference condition.

With reference now to FIG. 3, there is depicted an example lookup table illustrating intermodulation products that cause voice interference for the communication device 100 of FIG. 1, in accordance with one or more embodiments. Lookup table 300 includes network source A frequency band 320, network source B frequency band 330, integer m 325, and integer n 335.

Intermodulation distortion is the result of two or more signals interacting in a nonlinear device, such as communication device 100, to produce additional unwanted signals. These additional signals (intermodulation products) occur in the transmission systems of transceiver 122A and 122B. In one embodiment, two interacting signals (e.g. 223A and 223B) produce intermodulation products at the sum and difference of integer multiples of the original frequencies. For the two input signals 223A and 223B, the output frequency components can be expressed as: $m*ftx1+n*ftx2=frx\_k$, where m and n are integers and k is a corresponding receive frequency to either tx1 or tx2. In this equation, ftx1 is TxCF 222A and ftx2 is TxCF 222B. The order of the intermodulation product is the sum of integer m 325 and integer n 335. For any given pair of frequency bands there may be none, one, or more than one integer m 325 and integer n 335 pair that satisfies the relationship. Once ftx2 which is TxCF 222A and ftx2 which is TxCF 222B are known for each network source (RAN 280A and RAN 280B), lookup table 300 is generated with all integer m 325 and integer n 335 pairs known to cause voice interference.

Figure 4:
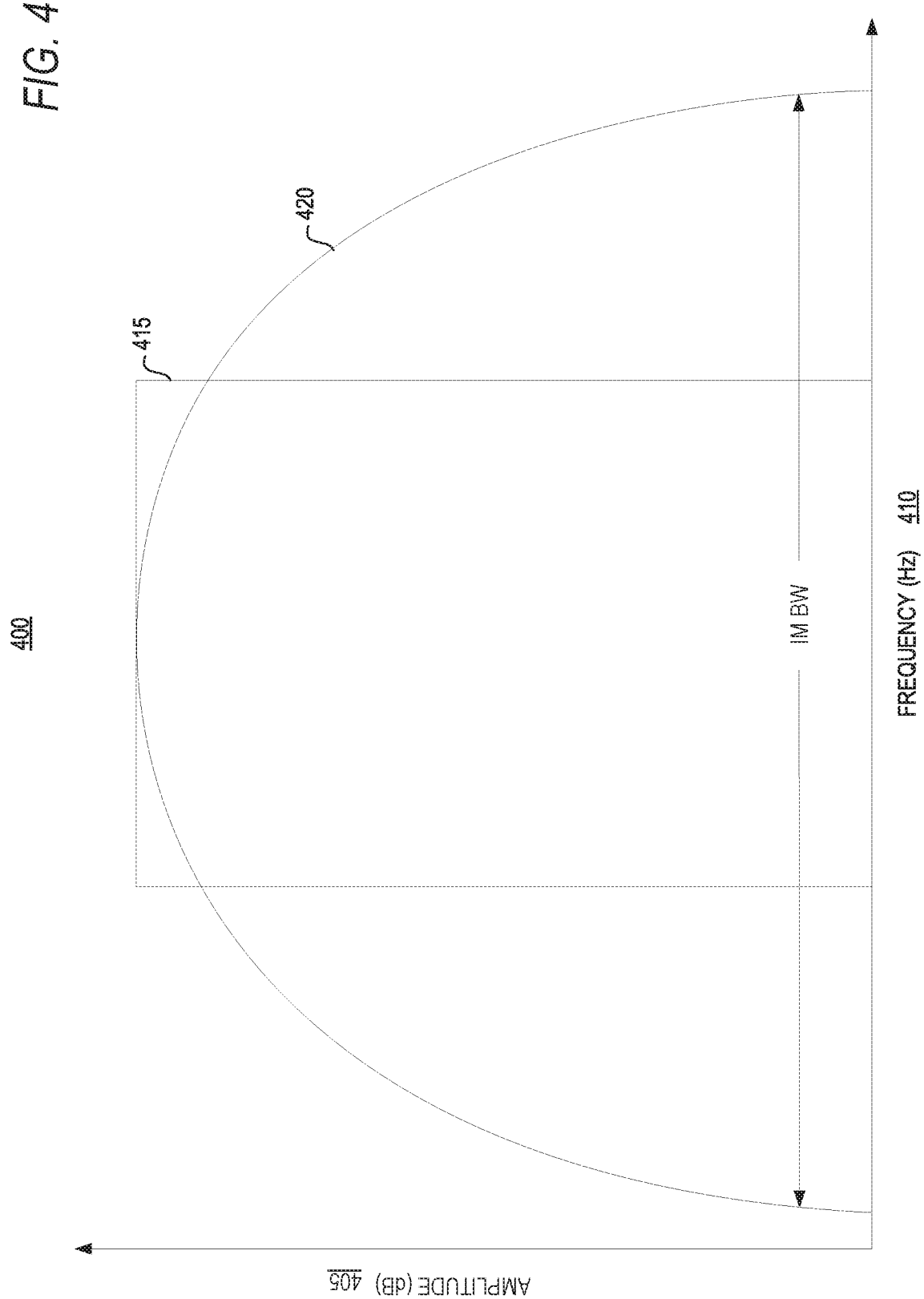
FIG. 4 is an example of an intermodulation interference and receive signal bandwidth spectrum for determining power adjustments verses center frequency offsets, according to one or more embodiments.

Processor 105 generates lookup table 300 based on the calculation of the predetermined intermodulation relationship. Lookup table 300 stores the values of each transmission characteristics that causes the intermodulation interference condition which interferes with the voice carrying signal. Processor 105 utilizes lookup table 300 to identify where the intermodulation bandwidth (IM BW) intersects with a receive signal bandwidth (415 of FIG. 4). Similar lookup tables can be generated in response to signals of finite bandwidth. With signals of finite bandwidth the intermodulation interference condition can be more complex. For example, with finite bandwidth signals IM BW is given by the relationship: IM BW=|m|*BWtx1+|n|*BWtx2, where BWtx1 is TxBW 234A and BWtx1 is TxBW 234B. The center frequency of the intermodulation interference can be found from the m*ftx1+n*ftx2 relationship if the center frequency (TxCF 222A and 222B) of each transmit signal is used. The bounds of the IM BW can be found from: $IM_{low}=IM_{center}$ (IM BW/2), $IM_{high}=IM_{center}$ (IM BW/2), where $IM_{low}$, $IM_{center}$, and $IM_{high}$ are respective frequency points that form an intermodulation interference spectrum. An example intermodulation interference spectrum is depicted in FIG. 4. In response to the frequencies defined by the range $IM_{low}$, $IM_{high}$ intersecting the respective receive bandwidth (RxBW 244A, RxBW 244B) in any way, the IM relationship is satisfied. Mathematically that relationship is stated as:

$$\text{if } [(f_{low\_Rx}<IM_{low} \&\& f_{high\_Rx}>IM_{high})\|(f_{low\_Rx}<IM_{low} \&\& f_{high\_Rx}>IM_{low})\|(f_{low\_Rx}>IM_{low} \&\& f_{high\_Rx} < IM_{high})\|(f_{low\_Rx}<IM_{high} \&\& f_{high\_Rx}>IM_{high})]$$ Equation 1:

is TRUE, then the IM relationship is satisfied for voice interference

In the equation 1 $f_{low\_Rx}$ and $f_{high\_Rx}$ are respectively a low and high frequency value on the receive the receive signal bandwidth spectrum (415 of FIG. 4). $IM_{low}$ and $IM_{high}$ are respectively a low and high frequency on the intermodulation interference bandwidth spectrum (420 of FIG. 4). In one embodiment, concurrent transmissions by the first (220A) and second (220B) transmitters result in an intermodulation interference condition that interferes with the voice carrying signal. FIG. 4 illustrates one example of such an intersection. Processor 105 determines if the intermodulation interference condition is detected based on a calculation of a predetermined intermodulation relationship, such as equation 1. The first calculated result confirms the intermodulation interference condition is a true condition and the data signal interferes with the voice carrying signal between the first receiver (240A) and the first network source (280A). Based on the true condition, processor 105 enables rescheduling of the transmission of the data signal. Rescheduling transmission of the data signal to a later time than a scheduled time is performed in response to confirming: (i) the first (220A) and second (220B) transmitter and the first receiver (240A) are concurrently active; (ii) the intermodulation interference condition is detected, based on the calculation of the predetermined intermodulation relationship (as determined by equation 1); and (iii) a power strength (TxPower 224A) of the voice carrying signal is below a predetermined interference power level.

In another embodiment, a second calculated result of equation 1 confirms the intermodulation interference condition is a false condition and the data signal does not interfere with the voice carrying signal. In response to the false condition, processor 105 generates and transmits, to the second network source (RAN 280B), a second control message that enables uninterrupted transmission of data signals.

FIG. 4 is an example of an intermodulation interference and receive signal bandwidth spectrum for determining power adjustments verses center frequency offsets, according to one or more embodiments. Spectrum 400 includes amplitude 405 (decibels (dB), y-axis), frequency 410 (hertz, x-axis), receive signal bandwidth spectrum 415, and intermodulation interference bandwidth spectrum 420.

In example spectrum 400, two bandwidths, receive signal bandwidth spectrum 415 and intermodulation interference bandwidth spectrum 420 are perfectly centered. The intermodulation bandwidth of intermodulation interference bandwidth spectrum 420 is greater than the receive bandwidth of receive signal bandwidth spectrum 415. In another embodiment, where the receive bandwidth is wider than the intermodulation bandwidth, an existing overlap satisfies an intermodulation interference condition. Further, if the centers of receive signal bandwidth spectrum 415 and intermodulation interference bandwidth spectrum 420 are offset from each other the intermodulation interference condition is equally TRUE as long as there is some intersection between the two bandwidths.

In one embodiment, there is only a slight intersection between receive signal bandwidth spectrum 415 and intermodulation interference bandwidth spectrum 420. The area of intersection is linearly proportional to the interference power. Therefore, a small area of intersection corresponds to a low interference power. Similarly, large area of intersection corresponds to a high interference power. When the shape of the transmit spectra is known, the shape of the intermodulation spectrum is also known. For the intermodulation relationship characterized by m*ftx1+n*ftx2, the transmit spectra is convolved with itself in the frequency domain 1 m| times, while the tx2 spectrum is convolved with itself |n| times, then the two results are convolved together. Processor 105 generates a lookup table (218) of power adjustments versus center frequency offsets. The power adjustments are obtained by multiplying the resulting intermodulation spectrum with the receive signal spectrum in the frequency domain and then integrating the result for each frequency offset between intermodulation and receive center frequencies.

Further, the interference power will also vary as either or both transmit powers (TxPower 224A and 224B) vary. Both the transmit power adjustments and the spectrum intersection adjustments are referenced to a maximum interference case and an associated with other transmission characteristics such as desense (228A and 228B). Processor 105 generates at least one LUT 218 to respectively store the calculated power adjustments and transmission characteristics. Processor 105 determines the amount of desense for any spectrum offset or transmit power levels based, at least in part on values store in LUT 218.

Figure 5:
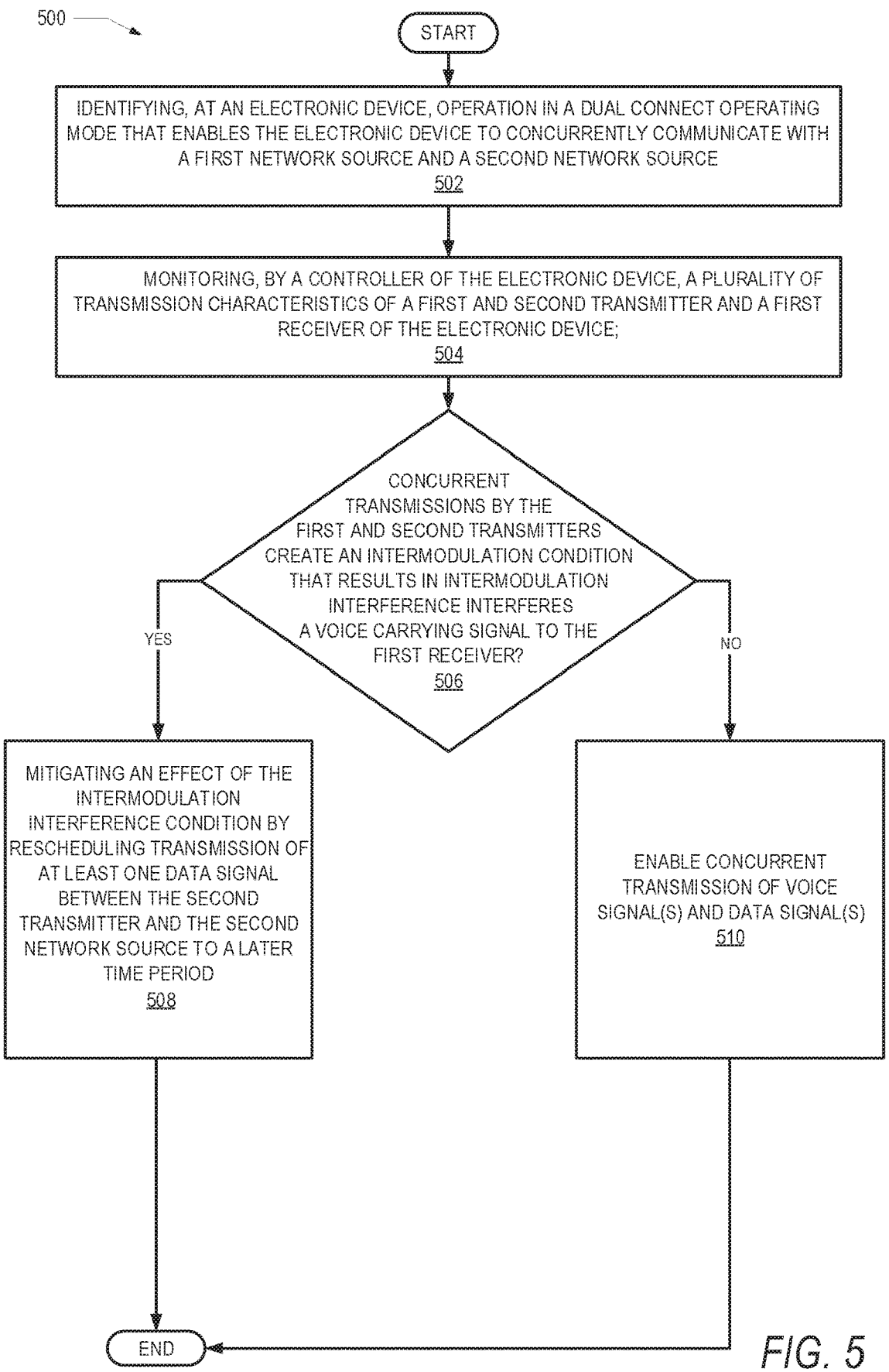
FIG. 5 is a flow diagram illustrating a method for coordinating transmission of data signals to multiple network sources from the communication device of FIG. 1, according to one or more embodiments.
Figure 6:
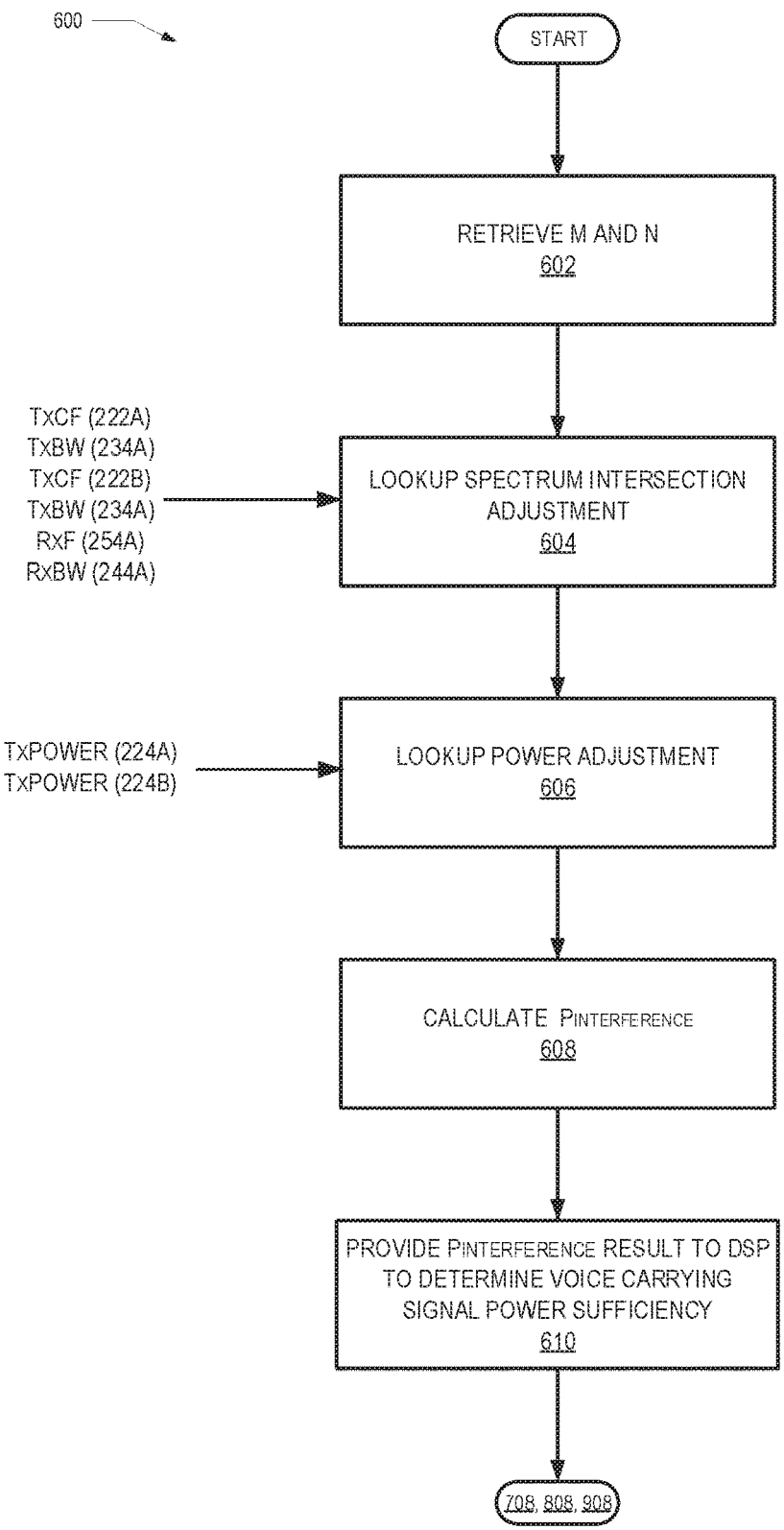
FIG. 6 is a flow diagram illustrating a method for determining receive signal power sufficiency to support coordinating transmission of data signals to multiple network sources from the communication device of FIG. 1, according to one or more embodiments.
Figure 7:
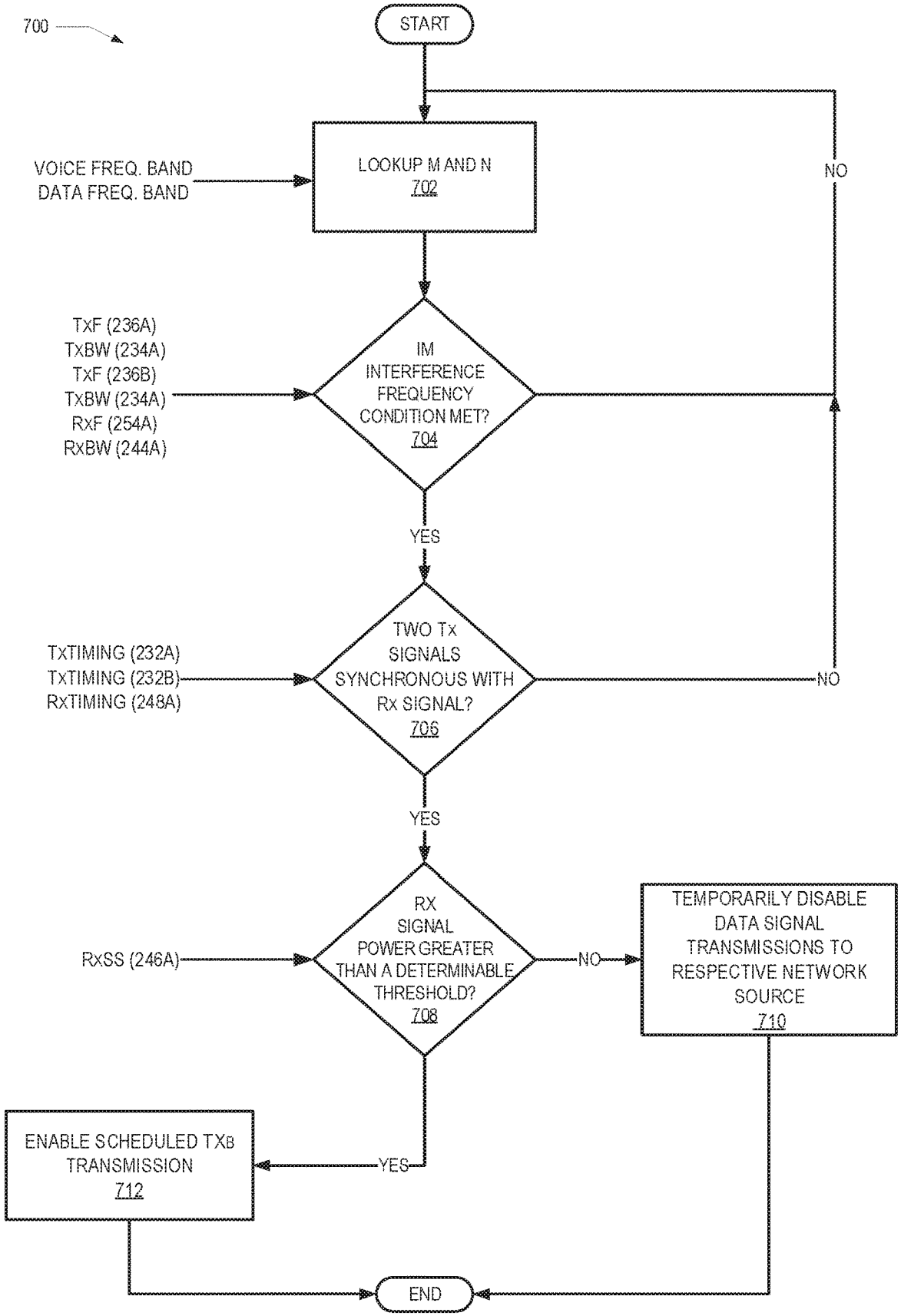
FIG. 7 is a flow diagram illustrating a method for coordinating transmission of data signals to multiple network sources from the communication device of FIG. 1 based on real-time performance of at least one of the multiple network sources in response to lost data packets, according to one or more embodiments.
Figure 8:
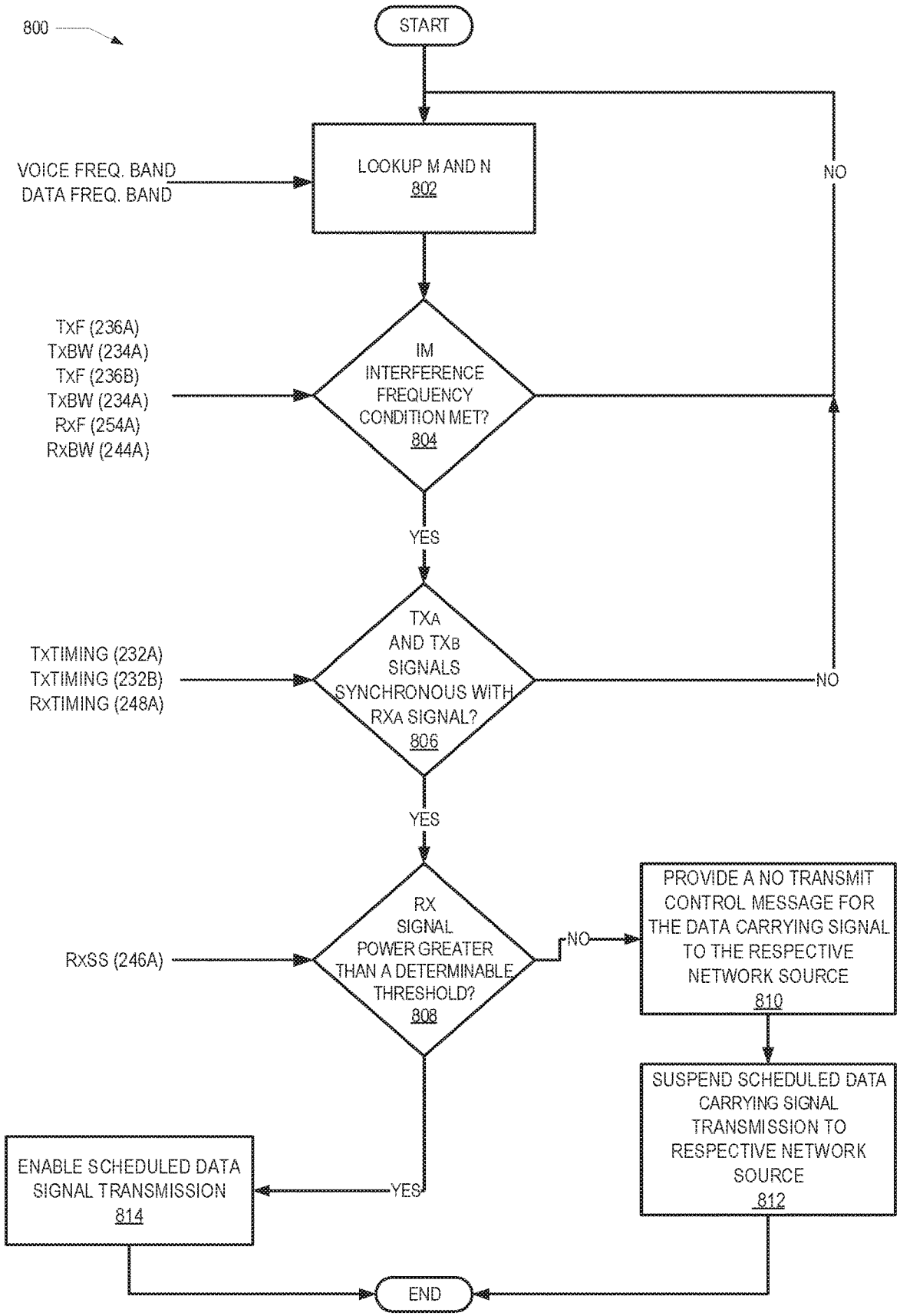
FIG. 8 is a flow diagram illustrating a method for providing power adjustment values to one or more of the multiple network sources from the communication device of FIG. 1, based on predicted performance in response to a predetermined resource assignment, according to one or more embodiments.
Figure 9:
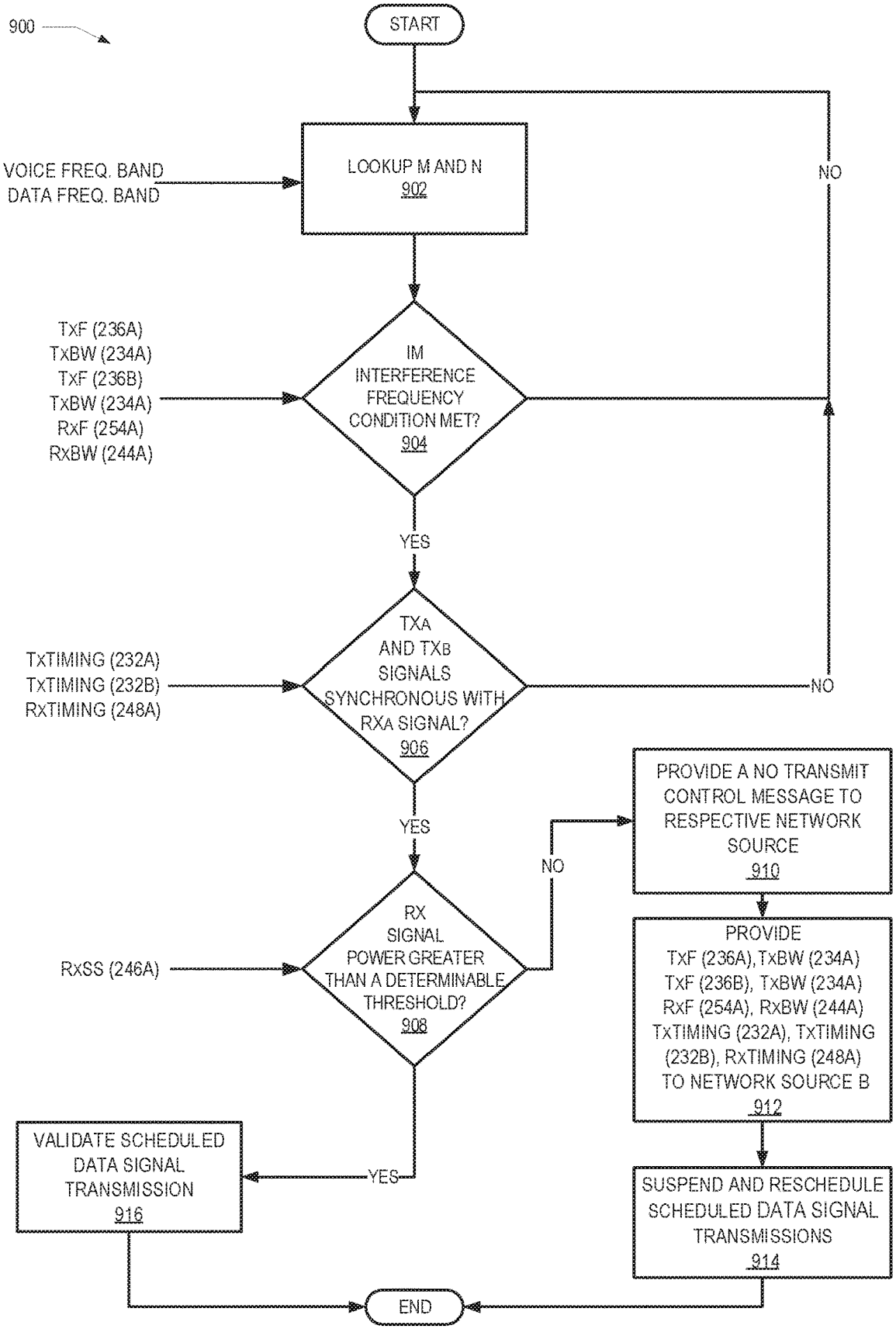
FIG. 9 is a flow diagram illustrating a method for generating a control message to at least one of the multiple network sources to modify one of a time and frequency of a data signal transmission from the communication device of FIG. 1, according to one or more embodiments.

Referring now to the flow charts of FIGS. 5, 6, 7, 8 and 9. In FIG. 5 is a flow diagram illustrating a method for coordinating transmission of data signals to multiple network sources from the communication device of FIG. 1. FIG. 6 is a flow diagram illustrating a method for determining receive signal power sufficiency to support coordinating transmission of data signals to multiple network sources from the communication device of FIG. 1. FIG. 7 is a flow diagram illustrating a method for coordinating transmission of data signals to multiple network sources from the communication device of FIG. 1 based on real-time performance of at least one of the multiple network sources in response to lost data packets. FIG. 8 is a flow diagram illustrating a method for providing power adjustment values to one or more of the multiple network sources from the communication device of FIG. 1 based on predicted performance in response to a predetermined resource assignment. FIG. 9 is a flow diagram illustrating a method for generating a control message to at least one of the multiple network sources to modify one of a time and frequency of a data signal transmission from the communication device of FIG. 1, according to one or more embodiments. Aspects of the methods are described with reference to the components of FIGS. 1-4. Several of the processes of the methods provided in FIGS. 5, 6, 7, 8, and 9 can be implemented by a processor (e.g., processor(s) 105) or DSP 108) executing software code of VSIM module 114. In the following method processes described in FIGS. 5, 6, 7, 8, and 9, processor 105 executes VSIM module 114 to perform the steps described herein.

Method 500 commences at the start block, then proceeds to block 502. At block 502 processor 105 identifies, at communication device 100, operation in a dual connect operating mode that enables communication device 100 to concurrently communicate with a first network source (280A) and a second network source (280B). At block 504, processor 105 monitors, by a controller (210) of communication device 100, a plurality of transmission characteristics of a first (220A) and second (220B) transmitter and a first receiver (240A) of electronic device 100. Processor 105 determines, based on the plurality of transmission characteristics, whether concurrent transmissions by the first (220A) and second (220B) transmitters result in an intermodulation interference condition that interferes with a voice carrying signal transmitting between the first receiver (240A) and the first network source (280A) (decision block 506). In response to determining concurrent transmissions of the first (220A) and second (220B) transmitters result in an intermodulation interference condition that interferes with a voice carrying signal, at block 508 processor 105 mitigates an effect of the intermodulation interference condition by rescheduling transmission of at least one data signal between the second transmitter (220B) and the second network source (280B) to a later time period. In response to determining concurrent transmissions of the first (220A) and second (220B) transmitters do not result in an intermodulation interference condition that interferes with a voice carrying signal, at block 510 processor 105 enables concurrent transmission of voice signal(s) and data signal(s). The process concludes at the end block.

Method 600 commences at the start block, then proceeds to block 602. At block 602, processor 105 receives the active voice and data frequency band. Based on the received voice and data frequency bands, processor 105 retrieves integer m 325 and integer n 335 pairs known to cause voice interference. Processor 105 receives at least one transmission characteristic from among a plurality of transmission characteristics. For example, processor 105 receives TxF 236A, TxBW 234A, TxF 236B, TxBW 234A, RxF 254A, and RxBW 244A and looks up the spectrum intersection adjustment based on the retrieved transmission characteristics, at block 604. At block 606 processor 105 retrieves TxPower 224A and 224B to lookup the power adjustment. In one embodiment, based on a known power interference equation, processor 105 executes DSP 108 to calculate the interference power, at block 608. In another embodiment, processor utilizes LUT(s) 218 to determine the power interference. At block 610, processor 105 executes DSP 108 to determine the voice carrying signal power sufficiency. The voice carrying signal power sufficiency is calculated based on current interference powers, values of at least one transmission characteristic and the current Tx power levels of the two bands. The value of the voice carrying signal power sufficiency is respectively provided to block 708, 808, and 908.

Method 700 commences at the start block, then proceeds to block 702. At block 702, processor 105 receives the active voice and data frequency band. Based on the received voice and data frequency bands, processor 105 retrieves integer m 325 and integer n 335 pairs known to cause voice interference. At decision block 704, processor 105 determines whether an intermodulation interference frequency condition is met, based on received transmit characteristics. The received transmit characteristics include, for example, TxF 236A, TxBW 234A, TxF 236B, TxBW 234A, RxF 254A, and RxBW 244A. In response to the intermodulation interference frequency condition not being met, the method returns to block 702. In response to the intermodulation interference frequency condition being met, the method continues to block 706. At block 706 processor 105 receives TxTiming 232A, TxTiming 232B, and RxTiming 248A. A decision is made, at block 706. Based on TxTiming 232A, TxTiming 232B, and RxTiming 248A, processor 105 determines whether the two transmit signals are synchronous with the receive signal. In response to the two transmit signals not being synchronous with the receive signal the method returns to block 702. In response to the two transmit signals being synchronous with the receive signal the method continues to decision block 708. At decision block 708, processor receives the receive signal strength. Based on calculated values from FIG. 6, a determination is made whether the calculated value for receive signal power is greater than a determinable threshold. In response to the receive signal power not being greater than a determinable threshold, at block 710 processor 105 temporarily disables data signal transmissions to the respective network source. In response to the receive signal power being greater than a determinable threshold, processor 105 enables the scheduled data signal transmissions to the respective network source (block 712). The process concludes at the end block.

Method 800 commences at the start block, then proceeds to block 802. At block 802, processor 105 receives the active voice and data frequency band. Based on the received voice and data frequency bands, processor 105 retrieves integer m 325 and integer n 335 pairs known to cause voice interference. At decision block 804, processor 105 determines whether an intermodulation interference frequency condition is met based on the received transmit characteristics. The received transmit characteristics include, for example, TxF 236A, TxBW 234A, TxF 236B, TxBW 234A, RxCF 242A, and RxBW 244A. In response to the intermodulation interference frequency condition not being met, the method returns to block 802. In response to the intermodulation interference frequency condition being met, the method continues to decision block 806. At decision block 806 processor 105 receives TxTiming 232A, TxTiming 232B, and RxTiming 248A. A decision is made, at block 806. Based on TxTiming 232A, TxTiming 232B, and RxTiming 248A, processor 105 determines whether the two transmit signals are synchronous with the receive signal. In response to the two transmit signals not being synchronous with the receive signal the method returns to block 802. In response to the two transmit signals being synchronous with the receive signal the method continues to decision block 808. At decision block 808, processor receives the receive signal strength (246A). Based on calculated values from FIG. 6, a determination is made whether the calculated value for receive signal power is greater than a determinable threshold. In response to the receive signal power not being greater than a determinable threshold, at block 810 processor 105 provides a no transmit control message for the data signal transmission to the respective network source. At block 812 processor 105 suspends scheduled data carrying signal transmission to the respective network source. In response to the receive signal power being greater than a determinable threshold, processor 105 enables the scheduled data signal transmissions to the respective network source (block 814). The process concludes at the end block.

Method 900 commences at the start block, then proceeds to block 902. At block 902, processor 105 receives the active voice and data frequency band. Based on the received voice and data frequency bands, processor 105 retrieves integer m 325 and integer n 335 pairs known to cause voice interference. At decision block 904, processor 105 determines whether an intermodulation interference frequency condition is met based on the received transmit characteristics. The received transmit characteristics include, for example, TxF 236A, TxBW 234A, TxF 236B, TxBW 234A, RxCF 242A, and RxBW 244A. In response to the intermodulation interference frequency condition not being met, the method returns to block 902. In response to the intermodulation interference frequency condition being met, the method continues to decision block 906. At decision block 906 processor 105 receives TxTiming 232A, TxTiming 232B, and RxTiming 248A. A decision is made, at block 906. Based on TxTiming 232A, TxTiming 232B, and RxTiming 248A, processor 105 determines whether the two transmit signals are synchronous with the receive signal. In response to the two transmit signals not being synchronous with the receive signal the method returns to block 902. In response to the two transmit signals being synchronous with the receive signal the method continues to decision block 908. Processor 105 monitors, by controller 210 of communication device 100, a receive signal power at the first receiver of communication device 100. At decision block 908, processor receives the receive signal strength (246A). Based on calculated values from FIG. 6, a determination is made whether the calculated value for receive signal power is exceeds a determinable receive signal power threshold.

In response to the receive signal power not exceeding the determinable receive signal power threshold, at block 910 processor 105 mitigates an effect of the receive signal power by providing a no transmit control message for the data signal transmission to the respective network source. At block 912 processor 105 provides at least one transmission characteristic from among a plurality of transmission characteristics to the network resource that is communicating the data signal. For example, the transmission characteristics include, for example TxF 236A, TxBW 234A, TxF 236B, TxBW 234A, RxF 254A, RxBW 244A, TxTiming 232A, TxTiming 232B, and RxTiming 248A. In one embodiment, each network (280A and 280B) stores transmission characteristics associated with their respective network. Therefore, processor 105 does not transmit the transmission characteristics to one or more of the networks (280A and 280B). By not transmitting the transmission characteristics, processor 105 advantageously reduces the amount of information transmitted to further mitigate intermodulation interference conditions between the respective network and communication device 100. Due to latency in the feedback of information provided by the respective network source, in another embodiment, processor 105 sends a timestamp with one or more respective transmission characteristics. The network correlates the timestamped one or more transmission characteristics to stored transmission characteristics. In response to the network not storing transmission characteristics of past states, processor 105 sends the one or more transmission characteristics to the network resource that is communicating the data signal. At block 914 processor 105 suspends scheduled data carrying signal transmission to the respective network source and reschedules transmission of at least one data signal between the second transmitter and the second network source to a later time period. In response to the receive signal power being greater than a determinable threshold, processor 105 validates the scheduled data signal transmissions to the respective network source (block 916). The process concludes at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   identifying, at a communication device, operation in a dual connect operating mode that enables the communication device to concurrently communicate with a first network source and a second network source;
   monitoring, by a controller of the communication device, a plurality of transmission characteristics of a first and second transmitter and a first receiver of the communication device;
   determining, based on the plurality of transmission characteristics, whether concurrent transmissions by the first and second transmitters result in an intermodulation interference condition that interferes with a voice carrying signal transmitting between the first receiver and the first network source; and
   in response to the concurrent transmissions resulting in the intermodulation interference condition, mitigating an effect of the intermodulation interference condition by rescheduling transmission of at least one data signal between the second transmitter and the second network source to a later time period.

2. The method of claim 1, wherein rescheduling transmission of the data signals comprises suspending a scheduled transmission of a data signal to the second network source from a scheduled transmission time and triggering the second network source to automatically reschedule transmission of data signals scheduled for transmission to the communication device, wherein the at least one data signal carries data packets between the communication device and the second network source.

3. The method of claim 1, wherein rescheduling transmission of data signals between the communication device and the second network source comprises:
   receiving a resource assignment that increases degradation of the voice carrying signal beyond a predetermined degradation threshold, based on a calculated prediction;
   in response to receiving a resource assignment that predictively increases degradation of the voice carrying signal beyond a predetermined degradation threshold, generating a control message for halting transmission of the data signal between the second transmitter and the second network source during transmissions of the voice carrying signal; and
   transmitting the control message to the second network source.

4. The method of claim 3, further comprising:
   generating a second control message for the second network source, the second control message identifying one or more causes of the intermodulation interference condition and triggering at least one of a schedule modification and signal frequency modification to avoid transmission of the data signal during the intermodulation interference condition; and
   transmitting the second control message to the second network source.

5. The method of claim 1, further comprising:
   calculating a transmit power adjustment and a spectrum intersection adjustment, based on the transmission characteristics, to determine a desense power level of the data signal, the transmission characteristics comprising: a power strength of the voice carrying signal, desense power levels of signals from the first and second transmitters, and time schedules for the first and second transmitters and the first receiver; and
   in response to the desense power level of the data signal not exceeding a predetermined desense threshold, transmitting the data signal at an original scheduled time.

6. The method of claim 1, wherein determining whether concurrent transmissions by the first and second transmitters result in an intermodulation interference condition that interferes with the voice carrying signal further comprises determining if the intermodulation interference condition is detected based on a calculation of a predetermined intermodulation relationship, wherein a first calculated result confirms the intermodulation interference condition is a true condition and the data signal interferes with the voice carrying signal between the first receiver and the first network source, and a second calculated result confirms the intermodulation interference condition is a false condition and the data signal does not interfere with the voice carrying signal.

7. The method of claim 6, wherein rescheduling transmission of the data signal to a later time than a scheduled time further is performed in response to confirming: (i) the first and second transmitter and the first receiver are concurrently active; (ii) the intermodulation interference condition is detected, based on the calculation of the predetermined intermodulation relationship; and (iii) a power strength of the voice carrying signal is below a predetermined interference power level.

8. The method of claim 6, further comprising:
in response to the false condition, generating and transmitting, to the second network source, a second control message that enables uninterrupted transmission of data signals;
monitoring transmission characteristics further comprises detecting a first and second transmitter center frequency, a receiver center frequency, a first and second transmit bandwidth, and a receive bandwidth to calculate the predetermined intermodulation relationship; and
generating, based on the calculation of the predetermined intermodulation relationship, a lookup table that stores the transmission characteristics, which causes the intermodulation interference condition that interferes with the voice carrying signal.

9. The method of claim 1, further comprising:
retrieving a real-time voice signal frequency, a resource block, and timing information associated with the first network source;
generating a schedule control message that includes the real-time voice signal frequency, the resource block, and the timing information associated with the first network source; and
transmitting the schedule control message to the second network source to reschedule transmission of the data signal based on the real-time voice signal frequency, the resource block, and the timing information associated with the first network source.

10. The method of claim 1, further comprising:
monitoring, by the controller of the communication device, a receive signal power at the first receiver of the communication device;
determining whether the receive signal power exceeds a determinable receive signal power threshold; and
in response to the receive signal power not exceeding the determinable receive signal power threshold, mitigating an effect of the receive signal power by rescheduling transmission of at least one data signal between the second transmitter and the second network source to a later time period.

11. A communication device comprising:
first and second transmitters capable of concurrently-transmitting during a dual connect operating mode;
a first receiver that receives a voice-carrying signal; and
a controller communicatively coupled with the first and second transmitters and that executes a voice signal interference mitigation module that enables the communication device to:
identify, at the communication device, operation in a dual connect operating mode that enables the communication device to concurrently communicate with a first network source and a second network source;
monitor, by a controller of the communication device, a plurality of transmission characteristics of a first and second transmitter and a first receiver of the communication device;
determine, based on the plurality of transmission characteristics, whether concurrent transmissions by the first and second transmitters result in an intermodulation interference condition that interferes with a voice carrying signal transmitting between the first receiver and the first network source; and
in response to the concurrent transmissions resulting in the intermodulation interference condition, mitigate an effect of the intermodulation interference condition by rescheduling transmission of at least one data signal between the second transmitter and the second network source to a later time period.

12. The communication device of claim 11, wherein, to mitigate an effect of the intermodulation interference condition by rescheduling transmission of at least one data signal between the second transmitter and the second network source to a later time period, the controller enables the communication device to:
suspend a scheduled transmission of a data signal to the second network source from a scheduled transmission time and trigger the second network source to automatically reschedule transmission of data signals scheduled for transmission to the communication device, wherein the at least one data signal carries data packets between the communication device and the second network source;
receive a resource assignment that increases degradation of the voice carrying signal beyond a predetermined degradation threshold, based on a calculated prediction;
in response to receiving a resource assignment that predictively increases degradation of the voice carrying signal beyond a predetermined degradation threshold, generate a control message for halting transmission of the data signal between the second transmitter and the second network source during transmissions of the voice carrying signal; and
transmit the control message to the second network source.

13. The communication device of claim 11, wherein, to mitigate an effect of the intermodulation interference condition by rescheduling transmission of at least one data signal between the second transmitter and the second network source to a later time period, the controller enables the communication device to:
generate a second control message for the second network source, the second control message identifying one or more causes of the intermodulation interference condition and triggering at least one of a schedule modification and signal frequency modification to avoid transmission of the data signal during the intermodulation interference condition;
transmit the second control message to the second network source;
calculate a transmit power adjustment and a spectrum intersection adjustment, based on the transmission characteristics, to determine a desense power level of the data signal, the transmission characteristics comprising: a power strength of the voice carrying signal, desense power levels of signals from the first and second transmitters, and time schedules for the first and second transmitters and the first receiver; and in response to the desense power level of the data signal not exceeding a predetermined desense threshold, transmit the data signal at an original scheduled time.

14. The communication device of claim 11, wherein, mitigate an effect of the intermodulation interference condition by rescheduling transmission of at least one data signal between the second transmitter and the second network source to a later time period, the controller enables the communication device to:

determine whether concurrent transmissions by the first and second transmitters result in an intermodulation interference condition that interferes with the voice carrying signal further comprises determining if the intermodulation interference condition is detected based on a calculation of a predetermined intermodulation relationship, wherein a first calculated result confirms the intermodulation interference condition is a true condition and the data signal interferes with the voice carrying signal between the first receiver and the first network source, and a second calculated result confirms the intermodulation interference condition is a false condition and the data signal does not interfere with the voice carrying signal;

confirm: (i) the first and second transmitter and the first receiver are concurrently active; (ii) the intermodulation interference condition is detected, based on the calculation of the predetermined intermodulation relationship; and (iii) a power strength of the voice carrying signal is below a predetermined interference power level;

in response to the false condition, generate and transmit, to the second network source, a second control message that enables uninterrupted transmission of data signals;

monitor transmission characteristics further comprises detecting a first and second transmitter center frequency, a receiver center frequency, a first and second transmit bandwidth, and a receive bandwidth to calculate the predetermined intermodulation relationship; and generate, based on the calculation of the predetermined intermodulation relationship, a lookup table that stores the transmission characteristics, which causes the intermodulation interference condition that interferes with the voice carrying signal.

15. The communication device of claim 11, wherein, to mitigate an effect of the intermodulation interference condition by rescheduling transmission of at least one data signal between the second transmitter and the second network source to a later time period, the controller enables the communication device to:

retrieve a real-time voice signal frequency, a resource block, and timing information associated with the first network source;

generate a schedule control message that includes the real-time voice signal frequency, the resource block, and the timing information associated with the first network source; and transmit the schedule control message to the second network source to reschedule transmission of the data signal based on the real-time voice signal frequency, the resource block, and the timing information associated with the first network source.

16. The communication device of claim 11, wherein, to mitigate an effect of the intermodulation interference condition by rescheduling transmission of at least one data signal between the second transmitter and the second network source to a later time period, the controller enables the communication device to:

monitors, by the controller of the communication device, a receive signal power at the first receiver of the communication device;

determines whether the receive signal power exceeds a determinable receive signal power threshold; and in response to the receive signal power not exceeding the determinable receive signal power threshold, mitigating an effect of the receive signal power by rescheduling transmission of at least one data signal between the second transmitter and the second network source to a later time period.

17. A computer program product comprising:

a computer readable storage device; and program code on the computer readable storage device that when executed by a processor associated with a communication device having a first and second transmitter and a first receiver for signal communication, the program code enables the communication device to provide a functionality of:

identifying, at the communication device, operation in a dual connect operating mode that enables the communication device to concurrently communicate with a first network source and a second network source;

monitoring, by a controller of the communication device, a plurality of transmission characteristics of a first and second transmitter and a first receiver of the communication device;

determining, based on the plurality of transmission characteristics, whether concurrent transmissions by the first and second transmitters result in an intermodulation interference condition that interferes with a voice carrying signal transmitting between the first receiver and the first network source; and in response to the concurrent transmissions resulting in the intermodulation interference condition, mitigating an effect of the intermodulation interference condition by rescheduling transmission of at least one data signal between the second transmitter and the second network source to a later time period.

18. The computer program product of claim 17, wherein the program code on the computer readable storage device that when executed by a processor associated with a communication device, further enables program code on the communication device to provide the functionality of:

suspending a scheduled transmission of a data signal to the second network source from a scheduled transmission time and trigger the second network source to automatically reschedule transmission of data signals scheduled for transmission to the communication device, wherein the at least one data signal carries data packets between the communication device and the second network source;

receiving a resource assignment that increases degradation of the voice carrying signal beyond a predetermined degradation threshold, based on a calculated prediction;

in response to receiving a resource assignment that predictively increases degradation of the voice carrying signal beyond a predetermined degradation threshold, generating a control message for halting transmission of the data signal between the second transmitter and the second network source during transmissions of the voice carrying signal;

transmitting the control message to the second network source;

generating a second control message for the second network source, the second control message identifying one or more causes of the intermodulation interference condition and triggering at least one of a schedule modification and signal frequency modification to avoid transmission of the data signal during the intermodulation interference condition;

transmit the second control message to the second network source;

calculating a transmit power adjustment and a spectrum intersection adjustment, based on the transmission characteristics, to determine a desense power level of the data signal, the transmission characteristics comprising: a power strength of the voice carrying signal, desense power levels of signals from the first and second transmitters, and time schedules for the first and second transmitters and the first receiver; and in response to the desense power level of the data signal not exceeding a predetermined desense threshold, transmitting the data signal at an original scheduled time.

19. The computer program product of claim 17, wherein the program code on the computer readable storage device that when executed by a processor associated with a communication device, further enables program code on the communication device to provide the functionality of:

determining whether concurrent transmissions by the first and second transmitters result in an intermodulation interference condition that interferes with the voice carrying signal further comprises determining if the intermodulation interference condition is detected based on a calculation of a predetermined intermodulation relationship, wherein a first calculated result confirms the intermodulation interference condition is a true condition and the data signal interferes with the voice carrying signal between the first receiver and the first network source, and a second calculated result confirms the intermodulation interference condition is a false condition and the data signal does not interfere with the voice carrying signal;

confirming: (i) the first and second transmitter and the first receiver are concurrently active; (ii) the intermodulation interference condition is detected, based on the calculation of the predetermined intermodulation relationship; and (iii) a power strength of the voice carrying signal is below a predetermined interference power level;

in response to the false condition, generating and transmit, to the second network source, a second control message that enables uninterrupted transmission of data signals;

monitoring transmission characteristics further comprises detecting a first and second transmitter center frequency, a receiver center frequency, a first and second transmit bandwidth, and a receive bandwidth to calculate the predetermined intermodulation relationship;

generating, based on the calculation of the predetermined intermodulation relationship, a lookup table that stores the transmission characteristics, which causes the intermodulation interference condition that interferes with the voice carrying signal;

retrieving a real-time voice signal frequency, a resource block, and timing information associated with the first network source;

generating a schedule control message that includes the real-time voice signal frequency, the resource block, and the timing information associated with the first network source; and transmitting the schedule control message to the second network source to reschedule transmission of the data signal based on the real-time voice signal frequency, the resource block, and the timing information associated with the first network source.

20. The computer program product of claim 17, wherein the program code on the computer readable storage device that when executed by a processor associated with the communication device, further enables program code on the communication device to provide the functionality of:

monitoring, by the controller of the communication device, a receive signal power at the first receiver of the communication device;

determining whether the receive signal power exceeds a determinable receive signal power threshold; and in response to the receive signal power not exceeding the determinable receive signal power threshold, mitigating an effect of the receive signal power by rescheduling transmission of at least one data signal between the second transmitter and the second network source to a later time period.

* * * * *